Dec. 9, 1941.  O. K. MARTI  2,265,608
VAPOR ELECTRIC CONVERTER
Filed Dec. 26, 1939  2 Sheets-Sheet 1
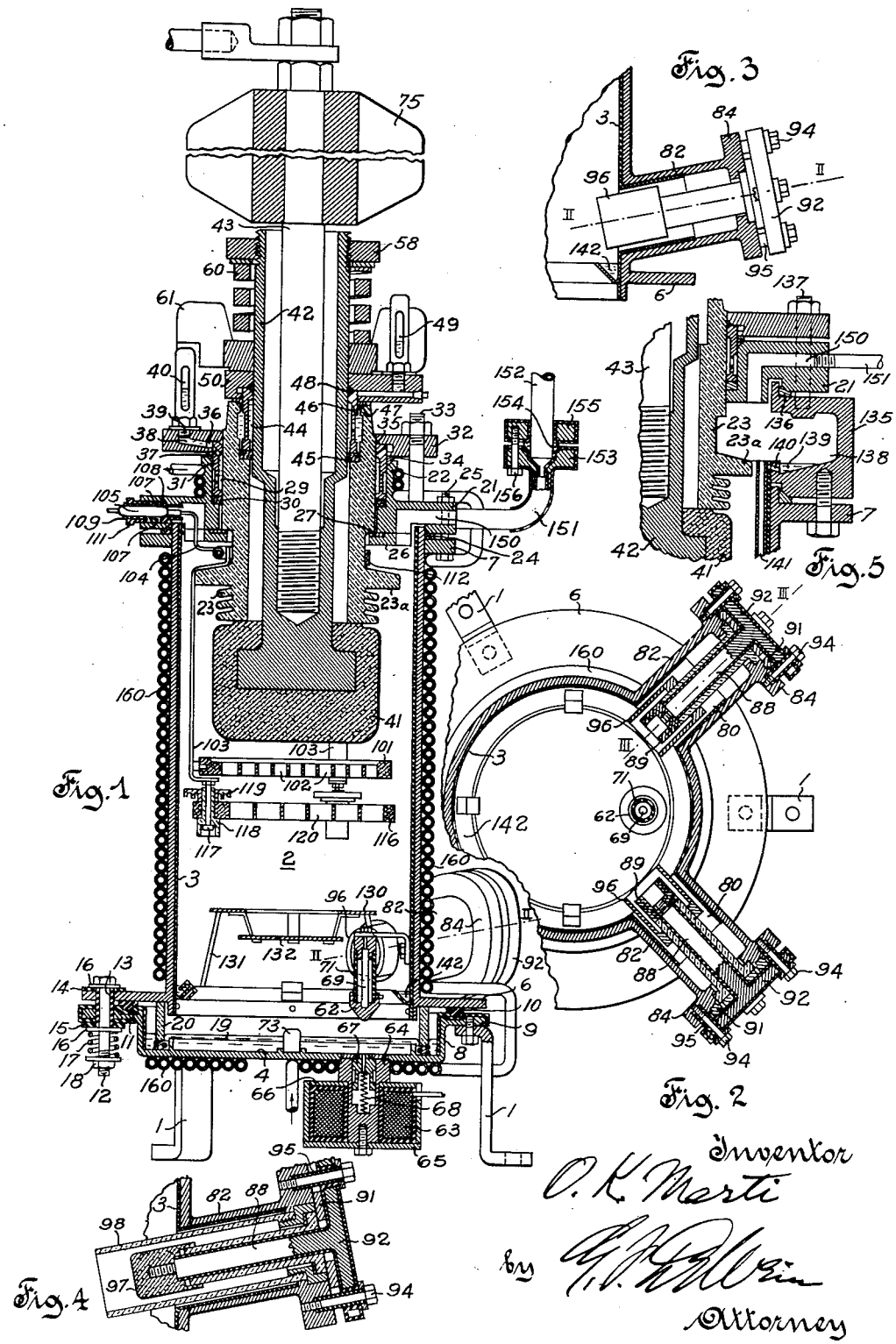

Dec. 9, 1941.  O. K. MARTI  2,265,608
VAPOR ELECTRIC CONVERTER
Filed Dec. 26, 1939   2 Sheets-Sheet 2

Inventor
O. K. Marti
by
Attorney

Patented Dec. 9, 1941

2,265,608

UNITED STATES PATENT OFFICE 2,265,608

VAPOR ELECTRIC CONVERTER

Othmar K. Marti, Wauwatosa, Wis., assignor to Allis-Chalmers Manufacturing Company, Milwaukee, Wis., a corporation of Delaware Application December 26, 1939, Serial No. 310,980

20 Claims. (Cl. 250—27.5)

The present invention relates to vapor arcing electric current converting apparatus of the mono-anode continuously excited liquid cathode type and more particularly to features of such apparatus which shall insure efficiency and capacity for preserving continuity of operating conditions while converting current of greater magnitudes than heretofore considered feasible in such apparatus.

Although the conventional multi-anode vapor arcing liquid cathode converter has proven to be—in spite of the many difficulties encountered in its development—highly satisfactory for the conversion of current at five hundred output volts and above as compared to that of rotating equipment, its efficiency (because of the many restrictive factors inherent in the construction of such apparatus including a minimum arc drop between the terminals of the anodes and cathode of from twenty volts at no load to substantially thirty volts at full load conditions) is not such as to render it generally acceptable for the conversion of currents at output voltages materially below five hundred volts.

Since it was found impractical to effect any material improvement in the efficiency of the multi-anode liquid cathode converter it was found necessary to devise such improvements in the mono-anode liquid cathode type of converter as would preserve continuity of operating conditions while converting currents of several hundred amperes and of such efficiency as would extend its use to the low voltage industrial power field.

A prime consideration in this new development was therefore that, in order that the efficiency of the converter be improved to the required extent, the physical distance between the arcing surfaces of the anode and cathode be reduced to the practical minimum for the required output voltage. A second prime consideration was that, although previously believed to be impractical, in order that the proven advantages of the durable operation of the multi-anode liquid cathode type of converter be secured, it would be most desirable that the cathode be continuously excited, that is to say that portions of the cathode be continuously vaporized and ionized, and that the auxiliary (excitation) electrodes for accomplishing such vaporization and ionization be particularly dimensioned and positioned relative to the cathode, anode and the casing walls. A third prime consideration was that a control electrode (also called grid) or control electrodes be so dimensioned and positioned across the path for the flow of vapor towards the anode as to insure stable control of the moments of the continual initiations of the flow of current between the anode and cathode, and to insure freedom from back fires. That is to say, the prevention of the initiation of destructive reverse flows of current through the converter from the cathode to the anode. A fourth prime consideration was that the density of the vapor produced from the cathode and the temperatures of the respective elements of the converter be so controlled as to maintain the condition of the respective elements within such limits as to insure stable operation under all operating conditions of the converter. And a fifth prime consideration resided in the provision of evacuating means of such characteristics and the connection of the converter thereto in such a manner as to permit evacuation of the converter in multiple with the evacuation of one or more other such converters.

It is therefore an object of the present invention to provide an electric current converter of the mono-anode continuously excited liquid cathode vapor arcing type which shall be capable of continuously converting currents in excess of one hundred amperes with an arc drop of materially less than twenty volts between the terminals of the anode and cathode thereof.

Another object of the present invention is to provide an electric current converter of the mono-anode continuously excited liquid cathode vapor arcing type in which the arcing surface of the anode is positioned facing the cathode and at such a distance therefrom as to provide an arc drop of materially less than twenty volts between the terminals of the anode and cathode during periods of the conversion of currents in excess of one hundred amperes at materially less than five hundred output volts.

Another object of the present invention is to provide an electric current converter of the mono-anode continuously excited liquid cathode vapor arcing type in which the arcing surface of the anode is so positioned relative to the cathode as to provide an arc drop of materially less than twenty volts between the terminals of the anode and cathode during periods of the continual conversion of currents in excess of one hundred amperes at materially less than five hundred output volts, in combination with means for regulating the moments of continual initiations of said conversion.

Another object of the present invention is the provision in an electric current converter of the mono-anode continuously excited liquid cathode vapor arcing type of energized control electrodes (grids) so positioned relative to the anode of the converter as to regulate the moments of initiation of the flow of current between the anode and the cathode and to prevent the initiation of reverse flow of current through the converter.

Another object of the present invention is the provision of evacuating means and the connection thereof to an electric current converter of the mono-anode liquid cathode vapor arcing type in such a manner as to permit the simultaneous evacuation of a plurality of similarly connected such converters.

Objects and advantages other than those above set forth will be apparent from the following description and claims when read in connection with the accompanying drawings in which:

Fig. 1 is a vertical sectional view of a mono-anode converter embodying the present invention;

Fig. 2 is a sectional view on line II—II of Fig. 1 showing the arrangement of the auxiliary electrodes for continuously vaporizing and ionizing portions of the cathode;

Fig. 3 is a sectional view on line III—III of Fig. 2 showing the angular position of the auxiliary electrodes;

Fig. 4 is a sectional view similar to Fig. 3 but showing a modified auxiliary electrode construction;

Fig. 5 is a partial vertical sectional view of a modified casing showing the upper portion thereof as having an enlarged diameter relative to the diameter of the similar portion of the casing of Fig. 1;

Figure 6:
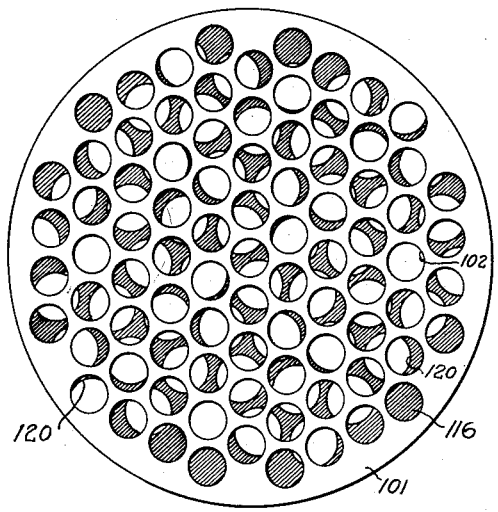
Fig. 6 is a plan view of the control electrodes illustrated in Fig. 1 wherein the upper or nearest to the anode of the two electrodes is superimposed on the lower electrode and illustrates (by means including the cross hatching of portions of the lower electrode) the relative diameters and positioning of the apertures therethrough.

Referring more particularly to the drawings by characters of reference, the reference numeral 2 designates a hermetically closed highly evacuated chamber having a cylindrical side wall portion, a bottom wall portion and a top wall portion constructed of a suitable metal, such as rolled steel. The side wall 3 has an internal diameter of substantially nine and one-half inches and as shown in the drawings, the internal surface thereof has a coating of insulating material, such as vitreous enamel, for the purpose of preventing the flow therethrough of leakage or stray currents. As further shown in Fig. 1 of the drawings, the side wall 3 includes outwardly extending annular flanges 6, 7 welded or otherwise suitably affixed thereto adjacent the bottom and top ends thereof to form supports for removable attachment thereto of the bottom and top wall portions.

The bottom wall is formed cup shaped, having a substantially flat bottom 4, a relatively short upstanding cylindrical side wall section 5 of somewhat greater internal diameter than the outer surface of the side wall 3 and an outwardly extending annular flange 9 adjacent the top thereof, for removable attachment to the flange 6. The internal surface of the side wall section 8 and the surfaces of the flange 9 are provided with coatings of suitable insulating material, such as a vitreous enamel, except at the points of connection of the supporting brackets 1, utilized as the lead in conductors for the cathode. The bottom wall is removably supported in gas tight insulated relation to the side wall 3 by means including an annular gasket 10 of rubber, or other suitable compressible insulating material, supported within an annular depression 11 in the flange 9 and compressed against the bottom wall surface of the flange 6 by suitable means such as bolts 12 disposed circumferentially along the flanges 6, 9 and passing through insulating bushings 13 extending through apertures in the flanges 6, 9 and through clamping washers 14, 15 of suitable insulating material, such as Bakelite. Springs 17 are interposed about the bolts 12 between the lower of the disks 16 and the clamping nuts 18 for the bolts 12 to compensate for expansions and contractions of the parts under variations of temperature. A quantity of mercury, or its equivalent, 19 supported on the bottom wall 4 serves as the liquid cathode and constitutes a source of ionizable vapor. An upstanding ring 20, of quartz, or other suitable heat resistant insulating material, is immersed in the cathode 19 coaxially with the side wall section 8 and in relatively close proximity thereto with its upper surface spring pressed into contact with the bottom surface of the flange 6 to thereby confine the operating surface of the cathode to the space within the ring 20 and thus prevent excessive heating of the gasket 10 and the insulating coatings on the interior surface of the section 8 and the flange 9.

As shown in Fig. 1 of the drawings, the top wall includes an outwardly extending annular flange section 21 removably attached to flange 7, in a manner to form a gas tight joint therebetween and an annular section 22 extending above the section 21 through which extends an annular insulator 23. As shown, the flange 21 is clamped in gas tight relation with the side wall 3 by compressing a gasket 24 of resilient rubber, or other suitable insulating material, between the side wall 3 and the flange 21 by means of bolts 25 passing through flanges 7 and 21.

The insulator 23 is held in position within the aperture in the section 22 by means of a suitably sectionized retaining ring 26 secured to the underside of the section 22. The insulator 23 includes an annular flange 23a extending proximately to the wall 3 to thereby intercept and divert vaporized portions of the cathode 19 towards the wall portion 3, and has its upper end somewhat enlarged to provide a shoulder 27 which rests on the retaining ring 26, a gasket such as asbestos being interposed between the shoulder 27 and the ring 26. The opening in the section 22 through which the insulator extends is somewhat greater than that part of the insulator 23 passing therethrough to provide a sealing space 29. The bottom of this sealing space 29 is filled with a ring of suitable packing material such as asbestos 30 constituting the lower foundation for the packing. This packing ring 30 is held in a compressed state by means of an annular stuffing bushing 31, the upper end of which extends above the upper end of the section 22. A ring 32 is mounted over the top of the stuffing bushing 31 and is drawn down against the section 22 by means of bolts 33 disposed circumferentially along the ring 32.

The ring 32 clamps packing ring 34 against the stuffing bushing 31 and the section 22 and the packing ring 35 against the stuffing bushing 31 and the insulator 23 so as to provide a tight enclosure at the upper end of the sealing space 29 around the insulator 23.

The ring 32 is provided with a groove or channel 36 along the upper edge of the stuffing bushing 31 and the bushing itself has a bore 37 through which communication is provided between the groove 36 and the sealing space 29. The groove 36, in turn, is connected through a bore 38 in the ring 32 with a mercury gauge in the form of a small mercury filled tube 40 threaded into an opening 39 on the top of the ring 32 and communicating with the bore 37. The sealing space 29 is filled with mercury by pouring it into the bore 37 through the opening 39 and a continuous check-up of the presence of mercury within the sealing space 29 is maintained by the mercury gauge 40.

The anode has a massive head portion 41 of heat resistant material and high thermal emissivity, such as graphite, with an arcing surface facing the cathode 19 and a cylindrical side wall surface of substantially seven inches in diameter extending coaxially ot the casing side wall portion 3. The anode head portion 41 is affixed, as by molding or otherwise, to a tubular stem portion 42 which extends through the interior of the insulator 23 and has an enlarged portion threaded at its upper end projecting above the insulator 23. The upper end of the insulator 23 has an enlarged opening providing a sealing space 44 for the anode seal. The lower end of this sealing space is closed by a packing 45 similar to the packing 30, a stuffing bushing 46, and packing rings 47, 48 of rubber, or other suitable material, completing the anode sealing space 44. This sealing space is filled with mercury and the mercury continuously maintained therein by means of a mercury gauge 49 incorporated in the clamping ring 50 in the way described in connection with gauge 40.

The anode head portion 41 is held clamped against the lower end of the insulator 23 by the action of the nut 58 threaded around the upper portion of the tubular stem portion 42, a spring 60 being interposed between the nut 58 and a finned heat radiating member 61 pressing against the clamping ring 50 to compensate expansions and contractions of the parts under variations of temperature to which they are subjected. A lead in conductor 43 screwed into the stem portion 42 is provided with a suitable heat radiating member 75, comprising a plurality of outwardly extending fins for dissipating heat generated at the anode during the converting operation to thereby assist in maintaining the anode at the proper operating temperature.

In order that stable operation may be secured at a voltage drop of materially less than twenty (20) volts between the terminals of the anode and cathode, it has been ascertained after extended experimentation that the distance from the surface of the cathode to the arcing surface of the anode should be maintained within a range of from approximately ten (10) inches to thirteen (13) inches. Repeated tests have established that during periods of full load backfires (reverse flow of current) occurred when the anode was positioned at a distance of less than approximately ten inches from the arcing surface of the cathode; and that a very material increase in the voltage drop between the terminals of the anode and cathode occurred when such surfaces were positioned at distances greater than approximately thirteen inches.

Although any one of numerous well known ignition means for initiating the vaporization and ionization of portions of the cathode material may be employed, the arrangement shown in Fig. 1 of the drawings is preferably utilized. As shown, the arrangement comprises an ignition anode 62 affixed to the casing wall 3 and having an arcing surface positioned substantially one inch from the arcing surface of the cathode 19. The anode 62 may be supported in either conductive or insulated relation to the casing wall 3 as preferred. Cooperating with the anode 62 is a solenoid 63 arranged about an extension 64 on the bottom wall 4 supporting the cathode. The extension is made of magnetic material and constitutes the fixed core of the solenoid. The solenoid is preferably supported by a cup shaped shield 65 bolted on the extension 64 and cooperates with a washer 66 in closing the magnetic circuit of the solenoid. Extension 64 includes a hollowed portion to define a cylinder for accommodating the movable armature 67 of the solenoid. The armature is preferably so shaped as to engage the wall surface of the cylinder in substantially liquid tight relation therewith and may preferably be provided with a coating of nonmagnetic material to prevent excessive magnetic attraction between the armature and the walls of the cylinder. Such coating may consist of a metal or any other suitable non-magnetic material, such as a vitreous enamel. The armature 67 is urged upward under the action of a spring 68. The armature is drilled to form a nozzle directed towards the ignition electrode 62 and adapted to produce momentarily a jet of cathode material extending through the cathode 19 and between the cathode and ignition anode 62 upon downward movement of the armature 67 from the rest position shown, resulting from energization of the solenoid 63. The source of current (not shown) for energizing the solenoid 63 may be either alternating or direct current as preferred, or as conditions may direct; and the same holds true with respect to the establishments of the ignition arcs between the anode 62 and the cathode 19. In cases where the anode 62 is arranged in conductive connection with the casing wall portion 3 and operated from the same source of current in multiple with the ignition electrodes of other converters having their casings conductively interconnected, a resistor 69 enclosed in an insulator 71 should be included in the connection of the electrode with the casing wall.

A pair of apertures are provided in the side wall 3 intermediate the cathode 19 and the arcing surface of the anode head 41 to which are affixed in gas tight relation, as by welding, tubulated outwardly extending arms 82 of suitable metallic material, such as rolled steel, and having laterally extending annular flange like portions 84, through which are removably attached auxiliary electrodes, generally called excitation anodes, alternately operative from a suitable source of alternating current (not shown) to continuously vaporize and ionize portions of the cathode 19, to thereby continuously provide a medium for continual initiations of arcs for the flow of current between the anode 41 and cathode 19. As shown in Figs. 2 and 3 of the drawings, each of the auxiliary electrodes includes a stem portion 88 of suitable material, such as steel or copper, and a head portion 89 of suitable heat resistant material, such as graphite. Although excitation anodes provided with substantially flat arcing surfaces such as shown in Fig. 4 of the drawings have been found to be generally satisfactory, it has been ascertained by tests that during periods of the conversion of currents of high magnitude, more stable operation is assured if the arcing surfaces of the excitation anodes are made cup shaped as shown in Fig. 2 of the drawings. The reason for such improvement has not been definitely ascertained, but it appears to be probably due to the additional shielding of the electrodes from the arc snuffing effect of the vapor produced from the cathode 19 which is of relative high density and velocity during periods of high current flow. As shown in Fig. 2 of the drawings, the surface of the stem portion 88 of each of the auxiliary electrodes is provided with a coating of insulating material, such as vitreous enamel, over which there is superimposed a tube of suitable heat resistant insulating material such as quartz. The auxiliary electrodes are removably supported within the chambers 80 defined by the arms 82 in electrically insulated gas tight relation therewith by means including annular gaskets 91, of rubber or other suitable compressible insulating material, positioned within annular depressions in the flanges 84 and the outwardly extending flange portions 92 of the stems 88 and compressed against the flanges 84 and 92 by suitabale means such as tap bolts 94 disposed circumferentially along the flanges 84 and passing through insulating bushings 95 extending through apertures in the flanges 92 and into the flanges 84 to thereby form gas tight joints between the flanges 84 and the auxiliary electrodes 88, 89.

As shown in the drawings, the auxiliary electrodes are, preferably, spaced on opposite sides of the ignition electrode 62 at points ninety degrees on the periphery of the casing side wall 3 and tests have demonstrated that the most stable operation of such electrodes is secured by tilting the same in a direction towards the cathode 19 with the center of the arcing surfaces thereof positioned substantially four inches from the arcing surface of the cathode 19. The head portions 89 of the auxiliary electrodes preferably extend slightly inward from the inner surface of the side wall 3 and are encompassed by tubular shields 96 of either electrically conductive or insulating material in spaced relation thereto and in spaced relation to the walls forming the chambers 80. In the embodiment according to Figs. 2 and 3 of the drawings the shields 96 extend into the chamber 2 a short distance beyond the head portions 89 and are affixed to the stem portions 88 adjacent the rear end of the head portions 89. They function to shield the arcing surfaces thereof from direct blasts of vapor and globules of mercury emitted from the cathode 19 and to prevent undue cooling of the auxiliary electrodes by reason of the proximity thereof to the cooled side wall 3.

In the arrangement of the auxiliary electrode assembly according to Fig. 4 of the drawings the arcing surface 97 is substantially flat instead of cup shaped and the shield 98 extends over not only the arcing head but also over the greater part of the lengths of the stem portion instead of over the head portion only.

It will be understood that a single auxiliary excitation electrode 88, 89 only will suffice in cases where it is desired to excite the converter from a source of direct current, and that the stabilization of the cathode spot may be facilitated by the addition of means, such as the button 73 of tungsten or other electrically conductive heat resistant material, affixed about the center of the arcing surface of the cathode 19.

In order that the moments of the recurring initation of the flow of current between the anode 41 and cathode 19 may be regulated and in order that liquid particles of the cathode material may be prevented from impinging on the arcing surface of the anode to such an extent as would create a cathode spot thereon with resultant back fires, i. e. reverse flow of current from the cathode to the anode, one or two control electrodes (also called grids) each having a plurality of apertures are positioned across the path for the flow of vaporized portions of cathode material towards the anode. Tests have established that a single control electrode if of particular dimensions as to thickness and diameter of the apertures will suffice if the normal output current of the converter does not exceed four hundred amperes, but that a second control electrode is required in cases when the normal output current of the converter exceeds four hundred amperes, and that an additional baffle is required in cases when the normal output current of the converter exceeds one thousand amperes. Moreover, in order that the control electrodes may perform their required functions it is essential that they be positioned across the path for the flow of vapor within a predetermined range of distances from the anode and that they be of predetermined dimensions, including in particular their thickness and the diameter of the apertures therethrough.

As shown in Figs. 1 and 6 of the drawings, a control electrode 101 of suitable heat resistant electrically conductive material, such as graphite, having a thickness of substantially one-half inch and a large number of substantially equally spaced circular apertures 102 each of substantially one-half inch diameter, is suspended across the chamber 2 with the peripheral surface thereof proximately to the inner surface of the wall portion 3 and has its upper surface positioned substantially one inch below the arcing surface of the anode head portion 41. The control electrode 101 may be fixedly supported in position by any suitable means such, for example, as by three or more equally spaced heat resistant metallic strips 103 severally affixed at their lower ends to the electrode, as by being screwed thereto, and at their upper ends to a split ring 112 of suitable metallic material arranged about the insulator 23 immediately above the flange 23a thereof.

For the purpose of impressing potentials from external sources (not shown) on the control electrode 101 of such characteristics as will control the moments of initiation of and prevent the establishment of arcs for the flow of current between the anode 41 and cathode 19, an electrically conductive connection 104 is led from the control electrode by way of the strips 103 and split ring 112 to connection with a conductor 105 extending through a radially extending aperture in the flange portion 21. The conductor 104 is insulated against electrically conductive contact with the casing walls, as by glass beads (not shown), substantially throughout its length from its connection with the ring 112 to its connection with the conductor 105. The surface of the conductor 105 has a coating of vitreous enamel and is supported in gas tight relation to the wall of the aperture by means of a ring packing 107 of rubber or other suitable compressible insulating material. The packing 107 is compressed against the conductor 105 and the wall of the aperture by annular insulators 108 and 109 of porcelain or other suitable insulating material encompassing the conductor 105 and having shoulders severally abutting a shoulder of the apertured wall and a nut 111 screwed into a threaded portion of the apertured wall.

Figure 7:
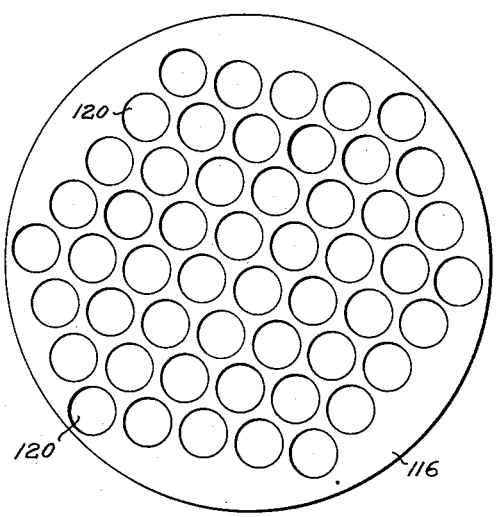
Fig. 7 is a plan view of the lower of the two control electrodes shown in Figs. 1 and 6.

A second control electrode 116 (for inclusion in cases when the flow of current through the converter exceeds four hundred amperes during periods of normal operation) is shown as being suspended from the strips 103 by means, such as bolts 117 extending through annular insulators 118 supported through apertures in the electrode 116 and encompassed by additional annular insulators 119 having downwardly extending slotted portions of such dimensions as to prevent such metallic or other electrically conductive deposits thereon as would result in the forming on the surfaces thereof of an electrically conductive connection between the electrode 116 and strips 103 or electrode 101. As shown in Figs. 1 and 7 of the drawings, the dimensions of the electrode 116 are substantially the same as those of electrode 101, except that the apertures 120 therethrough preferably have a diameter of substantially three-quarters of one inch. The electrode 116 is fixedly supported across the chamber 2 with its top surface substantially one inch below the bottom surface of the electrode 101, and, as shown in Fig. 6 of the drawings, the apertures 120 are so positioned relative to the apertures 102 as to intercept the direct flow of such large portions of the vapor and liquid particles of material liberated from the cathode 19 as will supplement the control actions of the electrode 101 and thereby facilitate the prevention of the creation of destructive cathode spots on the anode 41.

Figure 8:
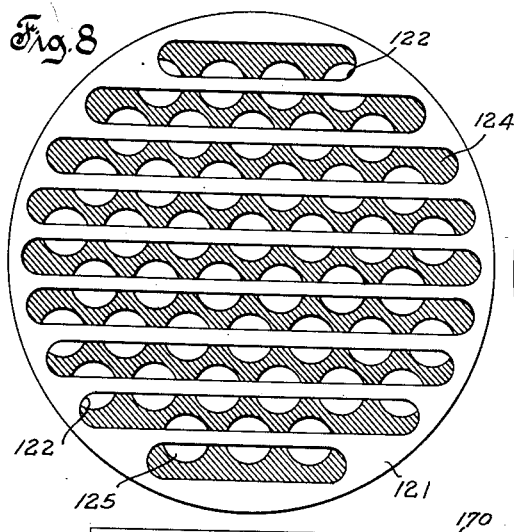
Fig. 8 is a plan view of a modified arrangement of the upper and lower control electrodes shown in Fig. 6.

Fig. 8 of the drawings shows a modified arrangement wherein an upper control electrode 121 has apertures 122 of elongated slot formation of substantially one-half inch width instead of cylindrical formation as in the electrode 101, superimposed over an electrode 124 having apertures as in the electrode 116 shown in Figs. 6 and 7, except that the apertures 125 in the electrode 124 extend in straight rows parallel to the slots 122 and in such positions as to supplement the control actions of the electrode 121.

Figure 9:
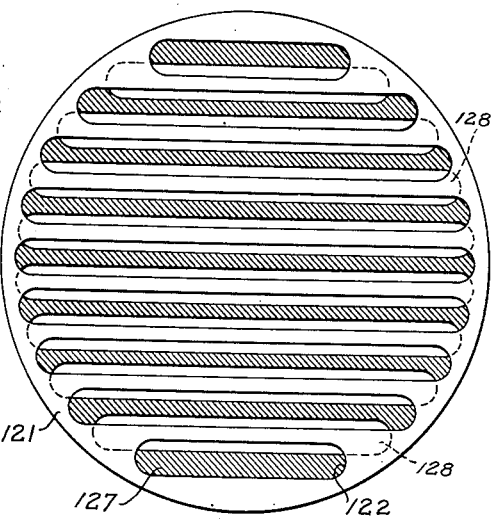
Fig. 9 is a plan view of a further modified arrangement of the upper and lower control electrodes shown in Fig. 6.

Fig. 9 of the drawings shows a further modified arrangement of the control electrodes wherein the lower electrode 127 is also provided with apertures 128 of elongated slot form extending parallel to the apertures 122 of the upper electrode 121. In this embodiment the apertures 122 and 128 are each substantially one-half inch wide and the apertures of the lower electrode 127 are staggered relative to the apertures through the electrode 121 to cause a circuitous flow of such large portions of the vapor towards the anode 41 as to supplement the control actions of the upper electrode 121.

For the sake of clearness, the wall portions of the control electrodes 116, 122 and 127 are cross hatched in Figs. 6, 8 and 9 of the drawings.

As a further protection against the impingement of excessive amounts of cathode material on the anode 41 during periods of the flow of current in excess of one thousand amperes between the anode and cathode there is provided, as shown in Fig. 1 of the drawings, a baffle positioned across the chamber 2 intermediate the cathode 19 and the control electrode 116, or 124 or 127, as the case may be, of any suitable heat resistant electrically conductive or insulating material, such, for example, as rolled steel or quartz. The baffle includes an annular portion 130 supported from the side wall 3 by three or more equally spaced rods 131 of quartz or other suitable heat resistant electrically insulating material and a disk portion 132 supported from the annular portion 130 by means of a plurality of spaced strips. The diameter and the position of the disk portion 132 relative to the dimensions of the annular portion 130 is such as to form a barrier against the flow of globules blasted from the cathode to the anode and such as to establish a circuitous path for the flow therethrough of vaporized portions of the cathode material.

The functions of the control electrodes 101, 116, 121, 124, 127 and the baffle 130, 132 are such that during periods when the anode 41 and the control electrode 101, or 121 are each temporarily impressed with positive potentials with respect to the potential of the cathode 19, a stream of electrons emitted from the latter passes through the control electrode or electrodes and the baffle to the anode, being brought into intimate contact with the control electrodes because of the size and large number of the apertures therethrough. When the anode passes from a positive potential to a negative potential relative to the cathode a large number of free ions, which are produced by the shattering of gas particles, collect in the arc path and would be drawn to the anode with the possibility of the creation of cathode spots thereon but for the fact that they are brought into intimate contact with the control electrode 101, or 121, which is at such times also negative with respect to the potential of the cathode. The said ions are therefore collapsed upon the control electrode, or electrodes, rather than upon the anode and prevent thereby the creation of destructive reverse arcs between the anode 41 and cathode 19.

The rate of collapse of the free ions may be somewhat increased by the connection of the lower control electrodes 116, or 124, or 127 with the upper control electrode 101, or 121, through a resistor (not shown) of comparatively high value. Moreover such a connection reduces the steepness of the potential gradient between the anode and cathode and thereby reduces the possibility of harmful effects on the operation of the converter.

In the arrangement according to Fig. 5 of the drawings the internal diameter of the upper end of the side wall 3 is materially enlarged, relative to the arrangement according to Fig. 1, by the addition of a flange 135 having a bottom wall removably affixed to the flange 7 in the manner explained with respect to Fig. 1, and a top wall to which is clamped in gas tight relation the flange portion 21 of the top wall by compressing an anular gasket 136 of resilient rubber, or other suitable material, between the top wall of flange 135 and the bottom wall of the flange 21 by means of bolts 137 passing through the flange 21 and secured in the flange 135 around the periphery thereof. The flange 135 forms, in effect, a chamber 138 for the expansion and condensation of such portions of the vapor generated from the cathode 19 as may flow upward beyond the flanged portion 23a of the insulator 23 and includes an upstanding ring portion 140 provided with a plurality of apertures extending from the lower outer surface to adjacent the top of the inner surface and defining a gutter 139. Ring 140 has affixed thereto drain pipes 141 extending downward along the wall 3 to connection with a similar ring affixed to the inner surface of the side wall 3 adjacent the bottom end thereof and defining a gutter 142. The gutters 139 and 142 constitute means for entrapping condensed portions of cathode material, separating therefrom foreign material such as may be disintegrated from the various elements of the converter and the return of the filtered portions of the condensate to the cathode.

As shown in Figs. 1 and 5, an aperture 150 is provided in the flange 21 having connection with a conduit 151 to form a passage for the periodic evacuation from the chamber 2 of such foreign gases as may be liberated from time to time from the walls and other elements of the converter. As shown in Fig. 1 of the drawings, the conduit 151 is connected with a second conduit 152 through an insulated joint consisting of an annular flange 153 formed integral with the conduit 151 and having a beveled portion at its inner upper end. The conduit 152 extends into the flange 153 and is clamped thereagainst in gas tight relation by an annular gasket 154 of rubber or other suitable compressible insulating material by means of a collar 155, having its surfaces also insulated, as by a coating of vitreous enamel, drawn against the gasket by means of bolts 156 extending through the flange 153 and secured into the collar 155 adjacent the periphery thereof.

Figure 10:
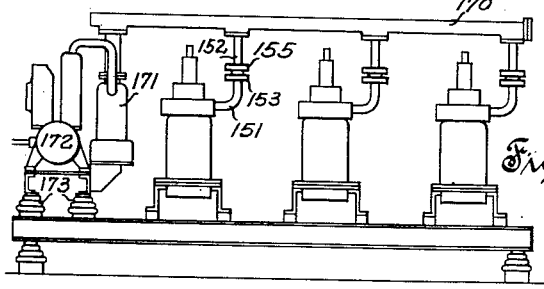
Fig. 10 is a diagrammatic view illustrating the electrically insulated multiple connection of a plurality of converters, such as shown in Fig. 1, with a pumping unit for effecting the evacuation of gases from such converters.

As indicated in Fig. 10, the conduit 152 may be connected, in multiple with similarly connected conduits of a plurality of other converters, through a third conduit 170 to a common pumping unit comprising a so-called high vacuum static pump 171, such as disclosed for example in the now expired United States Letters Patent No. 1,320,874 to Irving Langmuir and a serially connected rotary vacuum pump 172, such as disclosed, for example, in United States Letters Patent No. 1,494,758, issued May 20, 1924 to Oskar Seitz. As further indicated in Fig. 10, the pumps 171, 172 are each insulated from the converters and from ground by means including insulators 173, thereby effectively isolating the pumps from electrical connection with the converter or converters and from ground.

As shown in Fig. 1 of the drawings, the outer surfaces of the side wall 3, the bottom wall 4 and the flange portion 22 of the top wall each have coiled thereabout, pipes 160 of copper, or other material of high heat conductivity, which are preferably soldered thereto and serially connected to form passages for the flow of a cooling fluid (not shown), such as water, therethrough to thereby regulate the density of the vapor generated from the cathode 19 and to maintain the various elements of the converter within predetermined ranges of temperatures. It will be understood, however, that cooling means other than the pipes as shown may be employed for controlling the rate of condensation of the vapor and for controlling the temperatures of the elements of the converter.

Although certain of the elements of the illustrated embodiments of the invention are herein described as being of particular dimensions, it will be apparent to those skilled in the art that changes and modifications may be made therein without departing from the spirit of the invention or from the scope of the appended claims.

It is claimed and desired to secure by Letters Patent:

1. A mono-anode high power vapor arcing electric current converter comprising a casing forming a chamber having a side wall of electrically conductive material, a liquid cathode constituting a source of ionizable vapor disposed within said chamber, means for vaporizing and ionizing portions of said cathode, means for controlling the density of vaporized portions of said cathode comprising means forming a passage for the flow of a cooling fluid in heat transfer relation with said wall, an anode depending into said chamber having an arcing surface facing said cathode and constituting therewith spaced electrodes for the flow of current by way of ionized portions of cathode, and means for preventing the flow of leakage currents by way of said casing comprising an electrically non-conductive heat resistant material investing the inner surface of said side wall.

2. A mono-anode high power vapor arcing electric current converter comprising a casing forming a chamber having a side wall of electrically conductive material, a liquid cathode constituting a source of ionizable vapor disposed within said chamber, means for continuously vaporizing and ionizing portions of said cathode, means for controlling the density of vaporized portions of said cathode comprising means forming a passage for the flow of a cooling fluid in heat transfer relation with said wall, an anode depending into said chamber having an arcing surface facing said cathode and constituting therewith spaced electrodes for the flow of current by way of ionized portions of said cathode, and means for preventing the flow of leakage currents by way of said casing comprising a vitreous material investing the inner surface of said side wall.

3. A mono-anode high power vapor arcing electric current converter comprising a casing forming a chamber having a side wall of electrically conductive material, a liquid cathode constituting a source of ionizable vapor disposed within said chamber, an anode having an arcing surface facing said cathode in spaced relation therewith and supported in electrically insulated relation with said wall, means for initiating vaporization and ionization of portions of said cathode comprising an ignition electrode supported within said chamber in electrically conductive connection with said side wall, and means for continuously vaporizing and ionizing portions of said cathode to provide a medium for the continual initiations of arcs for the flow of current between said anode and cathode comprising at least one auxiliary electrode extending through an aperture in said wall in electrically insulated relation therewith and having an arcing surface positioned within said chamber intermediate said anode and cathode.

4. A mono-anode high power vapor arcing electric current converter comprising a casing forming a chamber having a wall of electrically conductive material, a liquid cathode constituting a source of ionizable vapor disposed within said chamber, an anode depending into said chamber in electrically insulated relation to said wall, the said anode having an arcing surface facing said cathode and a side wall surface extending in relatively close proximity to and normally equally spaced from said wall, means for continuously vaporizing and ionizing portions of said cathode comprising an auxiliary electrode having a stem portion extending through an aperture in said wall in electrically insulated relation thereto and having an arcing surface positioned within said chamber intermediate said anode and cathode, and means for controlling the density of vaporized portions of said cathode and for controlling the temperature of said anode comprising means forming a passage for the flow of a cooling fluid in heat transfer relation with said wall.

5. A mono-anode high power vapor arcing electric current converter comprising a casing forming a chamber having a side wall of electrically conductive material, a liquid cathode constituting a source of ionizable vapor disposed within said chamber, an anode depending into said chamber having an arcing surface facing said cathode and spaced therefrom a predetermined fixed distance to provide a total potential drop of materially less than twenty volts between the terminals of said anode and cathode during periods of the conduction of a current of substantially four hundred amperes by way of arcs therebetween, means for continuously vaporizing and ionizing portions of said cathode, means for controlling the density of vaporized portions of said cathode comprising means forming a passage for the flow of a cooling fluid in heat transfer relation with said wall, and means for controlling the moments of the continual initiations of the flow of current between said anode and cathode comprising a control electrode extending across said chamber intermediate said anode and cathode and having a plurality of apertures constituting restricted passages for the flow of vaporized portions of said cathode to said anode.

6. A mono-anode high power vapor arcing electric current converter comprising a casing forming a chamber having a side wall of electrically conductive material, a liquid cathode constituting a source of ionizable vapor disposed within said chamber, an anode having an arcing surface facing said cathode in spaced relation thereto and supported in electrically insulated relation to said wall, means for continuously vaporizing and ionizing portions of said cathode comprising an auxiliary electrode having a stem portion extending through an aperture in said wall in electrically insulated relation thereto and having an arcing surface positioned within said chamber intermediate said anode and cathode, means for controlling the density of vaporized portions of said cathode comprising means forming a passage for the flow of a cooling fluid in heat transfer relation to said wall, and a thermal shield encompassing said auxiliary electrode in spaced relation thereto and to the wall forming said aperture.

7. A mono-anode high power vapor arcing electric current converter comprising a casing forming a chamber having a side wall of electrically conductive material, a bottom wall supported in gas tight relation to said side wall, a liquid cathode constituting a source of ionizable vapor supported on said bottom wall, a top wall supported in gas tight relation to said side wall and having an aperture therein, an annular insulator extending through said aperture in gas tight relation to said top wall and having an annular flanged portion extending proximately to said side wall intermediate said cathode and said top wall, an anode having a stem portion extending through said insulator in gas tight relation thereto and having an arcing head portion positioned intermediate said cathode and said flanged portion of said insulator, the said side wall having a section of enlarged internal diameter positioned between said flanged portion of said insulator and said top wall, means for vaporizing and ionizing portions of said cathode, and means for condensing vaporized portions of said cathode comprising means forming a passage for the flow of a cooling fluid in heat transfer relation to said walls.

8. A mono-anode high power vapor arcing electric current converter comprising a casing forming a chamber having a side wall of electrically conductive material, a bottom wall supported in gas tight and electrically insulated relation to said side wall, a liquid cathode constituting a source of ionizable vapor supported on said bottom wall, a top wall supported in gas tight relation to said side wall and having an aperture therein, an annular insulator extending through said aperture in gas tight relation to said top wall and having an annular flanged portion extending proximately to said side wall intermediate said cathode and said top wall, an anode having a stem portion extending through said insulator in gas tight relation thereto and having an arcing head portion positioned intermediate said cathode and said flanged portion of said insulator, the said side wall having a section of enlarged internal diameter positioned between said flanged portion of said insulator and said top wall, means for continuously vaporizing and ionizing portions of said cathode, means for condensing vaporized portions of said cathode comprising means providing a passage for the flow of a cooling fluid in heat transfer relation to said side wall, means for entrapping, filtering and returning condensed portions of said vaporized portions to said cathode comprising an upstanding ring affixed to said side wall at the junction of said enlarged section therewith, and means for excavating non-condensable gases from said chamber comprising an aperture extending through said top wall.

9. A mono-anode high power vapor arcing electric current converter comprising a casing forming a chamber having a side wall of electrically conductive material, a liquid cathode constituting a source of ionizable vapor disposed within said chamber, means for continuously vaporizing and ionizing portions of said cathode, means for controlling the density of vaporized portions of said cathode comprising means forming a passage for the flow of a cooling fluid in heat transfer relation to said wall, an anode depending into said chamber having an arcing surface facing said cathode and spaced therefrom a predetermined distance to provide a potential drop of materially less than twenty volts between the terminals of said anode and cathode during periods of the conduction of a current of values materially greater than four hundred amperes by way of arcs therebetween, and means for controlling the moments of the continual initiations of the flow of current by way of arcs between said anode and cathode comprising a pair of spaced control electrodes disposed across said chamber intermediate said anode and cathode.

10. A mono-anode high power vapor arcing electric current converter comprising a casing forming a chamber having a side wall of electrically conductive material, a bottom wall supported in gas tight and electrically insulated relation to said side wall, a liquid cathode constituting a source of ionizable vapor supported on said bottom wall, a top wall supported in gas tight relation to said side wall and having an aperture therein, an annular insulator extending through said aperture in gas tight relation to said top wall and having an annular flanged portion extending proximately to said side wall intermediate said cathode and said top wall, an anode depending into said chamber having an arcing surface facing said cathode and spaced therefrom a predetermined distance to provide a potential drop of materially less twenty volts between the terminals of said anode and cathode during periods of the conduction of current by way of arcs therebetween, the said side wall having a section of enlarged internal diameter positioned between said flanged portion of said insulator and said top wall, means for continuously vaporizing and ionizing portions of said cathode to provide a medium for the continual initiations of the flow of current by way of arcs between said anode and cathode comprising at least one auxiliary electrode having an arcing surface positioned intermediate said anode and cathode and extending through an aperture in said side wall in spaced and electrically insulated relation to the wall forming said aperture and depending towards said cathode at an angle greater than the angle of repose to permit the drainage of condensed portions of said vaporized portions of said cathode through said aperture into said chamber, a thermal shield of electrically insulating material encompassing said auxiliary electrode in spaced relation thereto and to the wall forming said aperture, means for entrapping, filtering and returning condensed portions of said vaporized portions to said cathode comprising an upstanding ring affixed to said side wall at the junction of said enlarged section therewith, the said ring being provided with means for draining therefrom said condensed portions comprising at least one passage for the flow of said condensed portions from adjacent the outer base to the upper inner surface of said ring and thence by way of an enclosed passageway extending along the inner surface of said side wall to adjacent said cathode, means for controlling the moments of the continual initiations of the flow of current by way of arcs between said anode and cathode comprising a pair of spaced control electrodes disposed across said chamber intermediate said anode and cathode and each having a plurality of apertures constituting restricted passages for the flow of vaporized portions of said cathode towards said anode, means for condensing vaporized portions of said cathode comprising means forming a passage for the flow of a cooling fluid in heat transfer relation to said walls, and means for evacuating non-condensable gases from said chamber comprising an aperture in said top wall.

11. A mono-anode high power vapor arcing electric current converter comprising a casing forming a chamber having a wall of electrically conductive material, a liquid cathode constituting a source of ionizable vapor disposed within said chamber, an anode depending into said chamber in electrically insulated relation to said wall, the said anode having an arcing surface facing said cathode and a side wall surface extending in relatively close proximity with and normally equally spaced from said wall, means for continuously vaporizing and ionizing portions of said cathode to provide a medium for the continual initiations of the flow of current by way of arcs between said anode and cathode comprising a pair of auxiliary electrodes positioned intermediate said anode and cathode and extending through apertures in said wall at points spaced laterally thereof in spaced and electrically insulated relation to the walls forming said apertures and depending towards said cathode at an angle greater than the angle of repose to permit the drainage of condensed portions of said vaporized portions of said cathode through said apertures into said chamber, thermal shields of electrically insulating material severally encompassing said auxiliary electrodes in spaced relation thereto and to the walls forming said apertures, means for controlling the moments of the continual initiations of the flow of current by way of arcs between said anode and cathode comprising a pair of spaced control electrodes disposed across said chamber intermediate said anode and cathode and each having a plurality of apertures constituting restricted passages for the flow of vaporized portions of said cathode towards said anode, means for controlling the density of vaporized portions of said cathode and for controlling the temperature of said anode comprising means forming a passage for the flow of a cooling fluid in heat transfer relation to said wall, and means for evacuating non-condensable gases from said chamber comprising an aperture extending through said casing adjacent the top end of said wall.

12. A mono-anode highpower vapor arcing electric current converter comprising a casing forming a chamber having a side wall of electrically conductive material and having an aperture, said chamber having a transverse dimension of substantially nine and three-quarter inches, a liquid cathode constituting a source of ionizable vapor disposed within said chamber, an anode depending into said chamber having an arcing surface positioned substantially twelve inches from the surface of said cathode and having a transverse dimension of approximately seven inches, means for continuously vaporizing and ionizing portions of said cathode to provide a medium for the continual initiations of the flow of current by way of arcs between said anode and cathode comprising at least one auxiliary electrode positioned intermediate said anode and cathode and extending through said aperture in said wall in spaced and electrically insulated relation to the wall forming said aperture and depending towards said cathode at an angle greater than the angle of repose to permit the drainage of condensed portions of said vaporized portions of said cathode through said aperture into said chamber, a thermal shield encompassing the said auxiliary electrode in spaced relation thereto and in spaced relation to the wall forming said aperture, means for initiating vaporization and ionization of portions of said cathode comprising an ignition electrode supported within said chamber, means for controlling the moments of the continual initiations of the flow of current by way of arcs between said anode and cathode comprising a control electrode extending across said chamber having an upper surface positioned substantially one inch from the arcing surface of said anode and having a plurality of apertures of predetermined diameter and having a thickness extending towards said cathode of substantially one-half of one inch, means for controlling the density of vaporized portions of said cathode and for controlling the temperature of said anode comprising means forming a passage for the flow of a cooling fluid in heat transfer relation to said wall portion, means for evacuating non-condensable gases from said chamber comprising an aperture extending through said casing adjacent the top end of said side wall, and means for preventing the flow of leakage currents by way of said casing comprising an electrically non-conductive heat resistant material investing the inner surface of said side wall.

13. A mono-anode high power vapor arcing electric current converter comprising a casing forming a chamber having a side wall of electrically conductive material and having an aperture, the said chamber having a transverse dimension of substantially nine and three-quarter inches, a liquid cathode constituting a source of ionizable vapor disposed within said chamber, an anode depending into said chamber having an arcing surface positioned substantially twelve inches from the surface of said cathode and having a transverse dimension of approximately seven inches, means for continuously vaporizing and ionizing portions of said cathode to provide a medium for the continual initiations of the flow of current by way of arcs between said anode and cathode comprising at least one auxiliary electrode positioned intermediate said anode and cathode and extending through said aperture in spaced and electrically insulated relation to the wall forming said aperture and depending towards said cathode at an angle greater than the angle of repose to permit the drainage of condensed portions of said vaporized portions of said cathode through said aperture into said chamber, a thermal shield encompassing the said auxiliary electrode in spaced relation thereto and in spaced relation to the wall forming said aperture, means for initiating vaporization and ionization of portions of said cathode comprising an ignition electrode supported within said chamber, means for controlling the moments of the continual initiations of the flow of current by way of arcs between said anode and cathode comprising a control electrode extending across said chamber and having an upper surface positioned substantially one inch from the arcing surface of said anode and having a plurality of apertures of predetermined diameter and having a thickness extending towards said cathode of substantially one-half of one inch, means for controlling the density of vaporized portions of said cathode and for controlling the temperature of said anode comprising means forming a passage for the flow of a cooling fluid in heat transfer relation to said wall, means for evacuating non-condensable gases from said chamber comprising an aperture extending through said casing adjacent the top end of said wall, means for preventing the flow of leakage currents by way of said casing comprising an electrically non-conductive refractory material investing the inner surface of said wall, and means for preventing the flow of leakage currents between said auxiliary electrode and said casing comprising an electrically non-conductive material investing the stem portion of said electrode and a tubular insulator encompassing the said electrically non-conductive material.

14. A mono-anode high power vapor arcing electric current converter comprising a casing forming a chamber having a side wall of electrically conductive material and having an aperture, the said chamber having a transverse dimension of substantially nine and three-quarter inches, a liquid cathode constituting a source of ionizable vapor disposed within said chamber, an anode depending into said chamber having an arcing surface positioned substantially twelve inches from the surface of said cathode and having a dimension transverse to the arcing surface thereof of approximately seven inches, means for continuously vaporizing and ionizing portions of said cathode to provide a medium for the continual initiations of the flow of current by way of arcs between said anode and cathode comprising a pair of auxiliary electrodes positioned intermediate said anode and cathode and extending through apertures in said wall at points spaced laterally thereof in spaced and electrically insulated relation to the walls forming said apertures and depending towards said cathode at an angle greater than the angle of repose to permit the drainage of condensed portions of said vaporized portions of said cathode through said apertures into said chamber, thermal shields severally encompassing the said auxiliary electrodes in spaced relation thereto and in spaced relation to the walls forming said apertures, means for initiating vaporization and ionization of portions of said cathode comprising an ignition electrode supported within said chamber intermediate said anode and cathode and intermediate said auxiliary electrodes, means for controlling the continual initiations of the flow of current by way of arcs between said anode and cathode comprising a pair of control electrodes severally disposed across said chamber intermediate said anode and cathode and each having a plurality of apertures constituting restricted passages for the flow therethrough of vaporized portions of said cathode, the said anode arcing surface and the said control electrodes being spaced at predetermined fixed distances from each other and from said cathode to provide a total potential drop of materially less than twenty volts between the terminals of said anode and cathode during periods of the conduction of a current of several hundred amperes therebetween, means for controlling the density of vaporized portions of said cathode and for controlling the temperature of said anode comprising means forming a passage for the flow of a cooling fluid in heat transfer relation to said wall, means for evacuating non-condensable gases from said chamber comprising an aperture extending through said casing adjacent the top end of said side wall portion, and a baffle of electrically conductive refractory material supported between said cathode and said control electrodes for deflecting vaporized portions of said cathode towards said side wall portion.

15. A mono-anode high power vapor arcing electric current converter comprising a casing forming a chamber having a side wall of electrically conductive material and having an aperture, a liquid cathode constituting a source of ionizable vapor disposed within said chamber, an anode having an arcing surface facing said cathode in spaced relation thereto and supported in electrically insulated relation to said casing, means for continuously vaporizing and ionizing portions of said cathode comprising at least one auxiliary electrode having an arcing surface positioned within the path for the flow of vaporized portions of said cathode and substantially four inches from the surface thereof and having a stem portion extending through an aperture in said wall in spaced and electrically insulated relation thereto, the said electrode depending towards said cathode at an angle greater than the angle of repose to permit the drainage of condensed portions of said vaporized portions of said cathode through said aperture into said chamber, a thermal shield encompassing the said auxiliary electrode in spaced relation thereto and in spaced relation to the wall forming said aperture, means for controlling the moments of the continual initiations of the flow of current between said anode and cathode comprising a control electrode interposed between said anode and cathode having a plurality of apertures constituting restricted passages for the flow of vaporized portions of said cathode towards said anode, means for condensing vaporized portions of said cathode comprising means providing a passage for the flow of a cooling fluid in heat transfer relation to said side wall portion, and means for evacuating non-condensable gases from said chamber comprising an aperture extending through said casing adjacent the top end of said side wall portion.

16. A mono-anode high power vapor arcing electric current converter comprising a casing forming a chamber having a side wall of electrically conductive material and having an aperture and an outwardly extending flange adjacent the bottom end thereof, a cup like bottom wall having an upwardly extending section supported on said flange external to said side wall in gas tight and electrically insulated relation to said side wall, the inner surface of said upwardly extending section being invested with a coating of refractory electrically non-conductive material, a liquid cathode constituting a source of ionizable vapor supported within said bottom wall, a ring of refractory electrically non-conductive material extending through said cathode to contact with said flanged section intermediate the external surface of said side wall and the internal surface of the said upstanding section, means for continuously vaporizing and ionizing portions of said cathode comprising at least one auxiliary electrode having an arcing surface positioned within said chamber substantially four inches from the surface of said cathode and having a stem portion extending through said aperture in spaced and electrically insulated relation to the wall forming said aperture, means for controlling the moments of the continual initiations of the flow of current between said anode and cathode comprising a control electrode extending across said chamber intermediate said anode and cathode and having a plurality of apertures constituting restricted passages for the flow of vaporized portions of said cathode towards said anode, means for condensing vaporized portions of said cathode comprising means providing a passage for the flow of a cooling fluid in heat transfer relation to said side wall portion, and means for evacuating non-condensable gases from said chamber comprising an aperture extending through said casing adjacent the top end of said side wall portion.

17. A mono-anode high power vapor arcing electric current converter comprising a casing forming a chamber having a side wall of electrically conductive material and having an aperture, a bottom wall supported in gas tight and electrically insulated relation to said side wall, a liquid cathode constituting a source of ionizable vapor supported within said bottom wall, an anode depending into said chamber having an arcing surface facing said cathode and constituting therewith spaced electrodes for the flow of current by way of ionized portions of said cathode, means for continuously vaporizing and ionizing portions of said cathode comprising at least one auxiliary electrode having a cup shaped arcing surface positioned within the path for the flow of vaporized portions of said cathode intermediate said anode and cathode and having a stem portion extending through said aperture in spaced and electrically insulated relation to the wall forming said aperture, means for controlling the moments of the continual initiations of the flow of current by way of arcs between said anode and cathode comprising a control electrode extending across said chamber intermediate said anode and said auxiliary electrode and having a plurality of apertures of predetermined diameter, means for condensing vaporized portions of said cathode comprising means providing a passage for the flow of a cooling fluid in heat transfer relation to said side wall, and means for evacuating non-condensable gases from said chamber comprising an aperture extending through said casing adjacent the top end of said side wall.

18. In a vapor arcing electric current converter, the combination with a highly evacuated chamber, a liquid cathode and an anode supported in spaced relation within said chamber, and means for initiating vaporization and ionization of portions of said cathode to establish a medium for the flow of current by way of arcs between said anode and cathode, of means for controlling the moments of initiation of said flow of cur.ent comprising a control electrode having a plurality of cylindrical apertures of substantially one-half inch cross section supported adjacent said anode across the path for said flow of current, and a second control electrode supported across the path for said flow of current intermediate the first said control electrode and said cathode having a plurality of cylindrical apertures of materially greater cross section than the cross section of the apertures of the first said control electrode and so positioned relative to the apertures through the first said control electrode as to form circuitous paths for the flow of major portions of said vapor therethrough towards said anode, the diameters and the lengths of the said apertures being such as to bring within the influence of the walls thereof substantially all ionized portions of said vapor attempting to traverse the same.

19. The combination in a mono-anode high power arcing electric current converter comprising a casing forming a chamber having a side wall portion of electrically conductive material, a bottom wall portion having a side wall of electrically conductive material supported in gas tight and electrically insulated relation to said side wall, and a liquid cathode constituting a source of ionizable vapor supported on said bottom wall, of means for preventing the flow of leakage current between said wall portions comprising a vitreous material investing the inner surface of said side wall portion and the inner surface of the said side wall of the said bottom wall portion.

20. The combination in a mono-anode high power arcing electric current converter comprising a casing of electrically conductive material forming a chamber having wall portions at different electrical potentials, of means for preventing the flow of leakage current between said wall portions comprising a heat resistant electrical insulating material investing the inner surface of at least one of said wall portions.

OTHMAR K. MARTI.

CERTIFICATE OF CORRECTION.

Patent No. 2,265,608.   December 9, 1941.

OTHMAR K. MARTI.

It is hereby certified that error appears in the printed specification of the above numbered patent requiring correction as follows: Page 7, second column, line 44, claim 8, for the word "excavating" read --evacuating--; and that the said Letters Patent should be read with this correction therein that the same may conform to the record of the case in the Patent Office.

Signed and sealed this 13th day of January, A. D. 1942.

(Seal)

Henry Van Arsdale,
Acting Commissioner of Patents.